(12) United States Patent
Gatge et al.

(10) Patent No.: US 9,710,693 B2
(45) Date of Patent: Jul. 18, 2017

(54) METHOD AND APPARATUS FOR ANALYSIS AND COMPARISON OF FINGERPRINT IMAGES

(71) Applicants: Ramesh Gatge, West Midlands (GB); Leiyne Gatge, West Midlands (GB); Pryti Gatge, West Midlands (GB)

(72) Inventors: Ramesh Gatge, West Midlands (GB); Leiyne Gatge, West Midlands (GB); Pryti Gatge, West Midlands (GB)

( * ) Notice: Subject to any disclaimer, the term of this patent is extended or adjusted under 35 U.S.C. 154(b) by 82 days.

(21) Appl. No.: 14/604,853

(22) Filed: Jan. 26, 2015

(65) Prior Publication Data

US 2015/0213300 A1     Jul. 30, 2015

(30) Foreign Application Priority Data

Jan. 27, 2014  (GB) .................................. 1401383.3

(51) Int. Cl.
*G06K 9/00*      (2006.01)

(52) U.S. Cl.
CPC ....... *G06K 9/00073* (2013.01); *G06K 9/0008* (2013.01)

(58) Field of Classification Search
CPC .................... G06K 9/00073; G06K 9/0008
See application file for complete search history.

(56) References Cited

U.S. PATENT DOCUMENTS

| 7,327,859 | B1 * | 2/2008 | Chau ................. G06K 9/00046 382/116 |
|---|---|---|---|
| 2007/0014444 | A1 | 1/2007 | Nordin |
| 2008/0273770 | A1 | 11/2008 | Kohout |

FOREIGN PATENT DOCUMENTS

WO          01/06445   A1     1/2001

OTHER PUBLICATIONS

British Search Report, dated May 6, 2014, from the corresponding British application.

* cited by examiner

*Primary Examiner* — Nirav G Patel
(74) *Attorney, Agent, or Firm* — Young & Thompson

(57) ABSTRACT

A method of analysis and comparison of fingerprint images, includes creating a set of data from a first fingerprint image and employing the data for comparison with a set of data obtained from a second fingerprint image, comparing the two sets of data to establish a correspondence of relative positions of at least some minutiae and comparing the numbers of each of one or more different types of minutiae within a prescribed area of each image, the sets of data for the two fingerprint images further including the numbers of each of one or more different types of minutiae lying within a constellation type boundary defined by a plurality of minutiae of identical type and which encircle a core minutia.

4 Claims, 3 Drawing Sheets

METHOD AND APPARATUS FOR ANALYSIS AND COMPARISON OF FINGERPRINT IMAGES

TECHNICAL FIELD OF THE INVENTION

This invention relates to a method of fingerprint analysis and comparison.

The invention relates in particular, though not exclusively, to a method of analysing a fingerprint to provide a set of data which enables the fingerprint to be compared quickly and accurately against data which has previously been stored, or which is subsequently obtained, in respect of the same or other fingerprints.

BACKGROUND OF THE INVENTION

The two primary methods of analysing and storing fingerprint features are pattern based and minutia based.

The present invention is particularly directed to a minutia based type of approach, but in one of it's aspects may be regarded also as comprising a pattern based approach.

The present invention seeks to provide a method which enables two sets of fingerprint data to be compared more accurately and/or more quickly than hitherto.

SUMMARY OF THE INVENTION

In accordance with one aspect of the present invention there is provided a method of analysis of a fingerprint image to create sets of data which may then be used for comparison with data obtained from a second fingerprint image, said method comprising employing a scanning device to scan a fingerprint image and identify a plurality of minutiae, establishing the positions relative to one another of each of the minutiae of said plurality, providing a data store to store a set of data related to said relative positions of said minutiae, establishing the number of one or more types of minutiae of a first group of minutiae types present within said plurality, establishing the number of minutiae of one or more types of minutiae of a second group comprising other types of minutiae, storing in said data store data a set of data relating to the number of minutiae of one or more different types from the first group and from the second group and then comparing said sets of data stored in said data store concerning the relative positions and numbers of different minutiae with data obtained in a similar manner from another fingerprint image thereby to establish whether two fingerprints are identical.

The reference hereinto scanning a fingerprint image is to be understood as including scanning a finger as well as scanning an image of a finger or part thereof.

The method may comprise comparing the two sets of data to establish a correspondence of relative positions of at least some minutiae and comparing the numbers of each of one or more different types of minutiae within a prescribed area of the images.

Thus, expressed in broad terms, a comparison is made not only of the relative positions of minutiae in two images, but also of the numbers of each of the different types of minutiae. Thus a more accurate comparison and finding of identity of two images can be obtained as compared with comparison only of relative positions.

In accordance with another aspect of the present invention there is provided a method of analysis of a fingerprint image to create a set of data which may then be used for comparison with data obtained from a second fingerprint image, said method comprising employing a scanning device to identify a plurality of minutiae of a first type, selecting one of those minutiae to be a core minutia and surrounding said core minutia by an imaginary constellation loop comprising a plurality of other minutiae of that type and a plurality of minutiae of other types, creating a set of data which defines the positions relative to one another of at least each of said minutiae on the constellation loop and then counting the number of minutiae lying on and/or within the constellation loop and retaining in a data store said set of data and information related to the number of minutiae lying on and/or within the constellation loop whereby said set of data may then be compared with a set of data obtained in a similar manner from another fingerprint image to establish whether two fingerprints are identical.

In accordance with a further aspect of the present invention there is provided a method of analysis of a fingerprint image to create a set of data which may then be used for comparison with a set of data relating to a second fingerprint image, said method comprising employing a scanning device to identify a core minutia, establishing the number of major minutiae within a first predetermined distance from said core minutia, establishing the number of minor minutiae within a second predetermined distance from said core minutia, providing a data store to store a set of data related to the identified number of major and number of minor minutiae whereby said data may then be compared with a set of data obtained in a similar manner from another fingerprint image to establish whether two fingerprints are identical.

Said first and second predetermined distances may be equal, or one may be greater than the other. Preferably the two distances are equal. Preferably a ratio is established of the number of major minutiae relative to the number of minor minutiae.

The term "major" minutiae is used herein to refer to minutiae of a type which generally are more dominant than others, whether by numbers or individual visual impact. It is envisaged that usually arch, loop and whorl type minutiae will be appropriately classed as "major".

The term "minor" minutiae is used herein to refer to other and less dominant minutiae types. It is envisaged that bridge, dot, ending, bifurcation, spur, triangle, merge, island, ridge ending, ladder, and enclosure types will be classed as "minor".

Optionally the method additionally may comprises scanning a fingerprint image to identify a plurality of minutiae of a first type and then creating a first set of data which defines the positions of each said minutia of the first type relative to the others of that type, creating one or more further sets of data each in respect of a plurality of a different type of minutiae to create one or more further sets of data each in respect of a different type of minutia and then comparing all or at least some of the sets of data with one or more sets of data obtained from another fingerprint image thereby further to assist in establishing whether two fingerprints are identical.

The method may comprise performing a plurality of scanning operations each of which identifies a particular type of minutia, typically of a major type, thereby enabling a constellation loop to be established for analysis.

Alternatively the method may comprise performing a single scanning operation to provide a scan which is then analysed to identify the positions of each of the major minutiae thereby to enable a constellation loop to be established for analysis.

The relative positions of the minutiae of the major type may be determined, and a set of data created, by selecting two of the major minutiae which are relatively well spaced apart whereby those two minutiae are then employed as base references relative to which the positions of other minutiae of that type is then determined thereby to create a set of data for subsequent comparison purposes.

The positioning of said other minutiae relative to said base references may be established by assessing the distance of each said other minutiae from each of the base references.

Preferably, however, the position of each said other minutiae is established by determining the angle which each said other minutiae subtends at each of said base references relative to an imaginary base line which extends between the two base reference minutiae.

Thus, in accordance with a yet further aspect of the present invention triangulation type data is established in respect of the angles of a triangle the corners of which are the positions of three minutiae of the same type.

Although reference has been made above to establishing data in respect of the position of one further minutia relative to the two base reference minutiae of that same type, to enable an accurate comparison of two sets of data obtained from two different fingerprint images, the present invention teaches that a set of data is created which includes the position relative to the base reference minutiae of each of a plurality of widely spaced apart other minutiae of the same type. Preferably sets of data are created in respect of the positions of at least five and more preferably at least ten other minutia of the same type.

More preferably two or more sets of data each for a different type of minutia are established from a scanning operation for subsequent comparison purposes.

Preferably sets of data are created in respect of at least said three major and more preferably at least six different types of minutia.

As an alternative to the use of two base reference minutiae, one minutia may be identified and employed as a reference point whereby the angle which two other minutiae of the same type subtend relative to one another about the base reference minutia is then determined. Further similar type minutiae are then identified and the angles which they each subtend relative to one another about the base reference minutiae are then determined thereby to establish a set of data which is characteristic of the fingerprint and which may be employed to assist comparison with a set of data obtained in a similar manner from another fingerprint sample.

In accordance with a yet further aspect of the present invention there is provided apparatus for analysis and comparison of fingerprint images, said apparatus comprises a scanning device for scanning a fingerprint image, identifying a plurality of minutiae and establishing the positions relative to one another of each of the minutiae of said plurality, a data store to store a set of data related to said relative positions of said minutiae and comparison means for comparing sets of data stored in the data store concerning the relative positions and numbers of different minutiae of two fingerprint images thereby for establishing whether two fingerprints are identical.

BRIEF DESCRIPTION OF THE DRAWINGS

Embodiments of the present invention will now be described by way of example only with reference to the accompanying FIG. 1 of a fingerprint constellation type pattern, FIG. 2 which shows schematically part of a fingerprint and the establishment of data from that fingerprint, and FIG. 3 which shows schematically part of another fingerprint and another procedure for the establishment of data from that fingerprint.

DETAILED DESCRIPTION OF THE DRAWINGS

Figure 1:
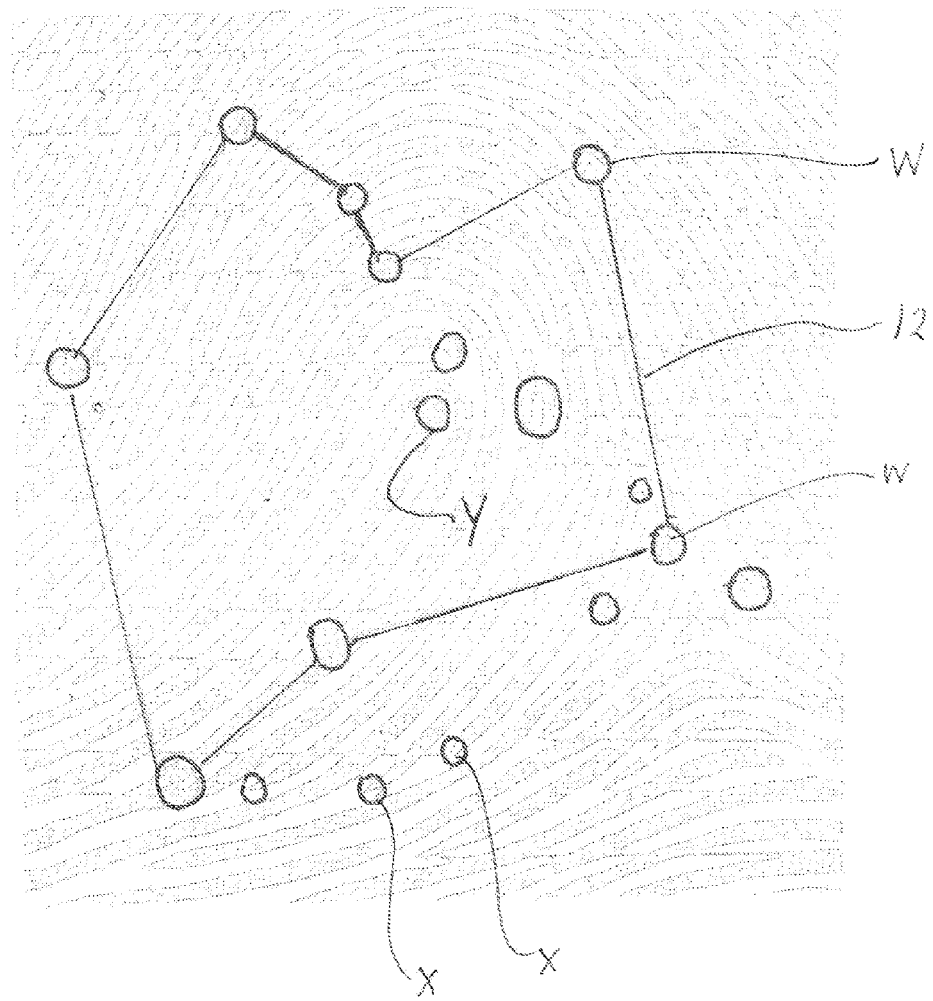

As shown in FIG. 1 the minutiae W of a bifurcation type may be interconnected, at least notionally, to form a constellation type pattern 12 and said pattern may be employed to provide a first set of data for comparison with a set of data obtained from another fingerprint sample. Such a constellation type pattern formed by the positions of bifurcations W, but not other features such as ends X, is shown in FIG. 1. For improved accuracy and speed of comparison preferably two or more sets of data are prepared each in respect of minutiae of a different type and then employed for comparison with one or more sets of data of corresponding minutiae obtained from another fingerprint sample.

The comparison described in the preceding paragraph preferably additionally comprises one or more of:
a) Comparing, for two images, the number of minutiae of any type lying within and/or on the constellation loop or other defined area such as within a prescribed distance from a core minutia Y;
b) Comparing, for two images, a number of minutiae or each of two or more types of minutia lying within and/or a constellation loop or other defined area such as within a prescribed distance from a core minutia;
c) The comparison of a) or b) above but additionally or alternatively in respect of minutiae lying outside of the constellation loop, for example within a prescribed distance form the constellation loop or from a core minutia Y.

Figure 2:
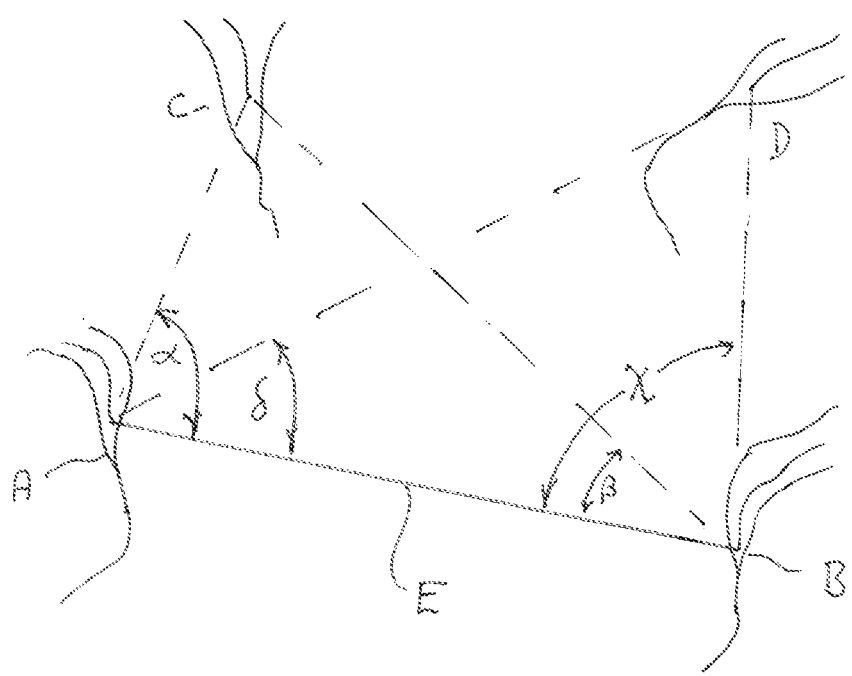

The fingerprint shown in part in the accompanying FIG. 2 comprises four bifurcation features A, B, C and D.

In this example the bifurcations A and B define ends of a base reference line E.

The angle which C subtends relative to the base line E about the feature A has the angle $\alpha$. The angle which C subtends relative to the base line E about the feature B has the angle $\beta$.

The angle which D subtends relative to the base line E about the feature A has the angle $\delta$. The angle which D subtends relative to the base line E about the feature B has the angle $\chi$.

Accordingly a complete set of data of the relative positions of the four bifurcation features can be established without the need for any measurement of the distance between the features. That data may then be compared with a set of data obtained in a similar manner from another fingerprint sample to assist with establishing whether the two fingerprint samples are identical.

Figure 3:
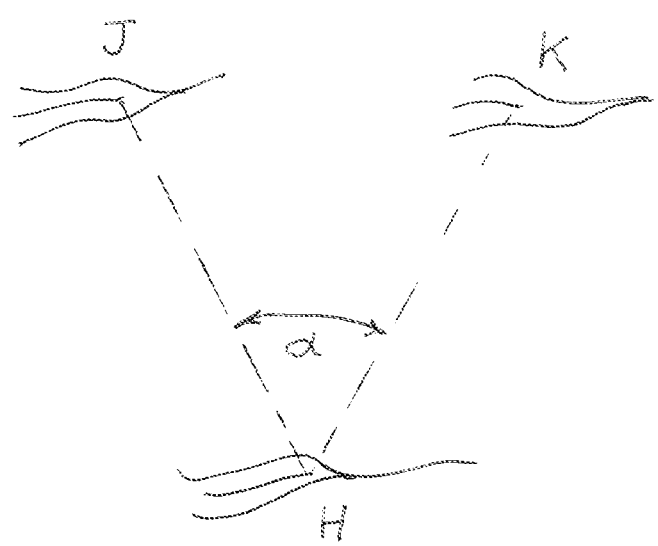

In the case of the fingerprint sample shown in FIG. 3 one bifurcation feature H is identified and employed as a base reference feature. Two other bifurcation features J, K, which are well spaced apart, are then identified and the angle $\alpha$ which they subtend about the feature H is then established. This process is repeated for other bifurcation features which lie around the base reference feature H thereby to establish a set of data of relative positions and which may be employed for comparison with a set of data of a similar type derived from another fingerprint sample thereby to assist with establishing whether the two fingerprint samples are identical.

The invention claimed is:
1. A method of analysis and comparison of fingerprint images, said method comprising:

receiving a first fingerprint image from a fingerprint imaging device;

creating a first set of data from the first fingerprint image; and comparing said data with a second set of data obtained from a second fingerprint image to establish a correspondence of relative positions of minutiae of said first and second fingerprints, and comparing numbers of each of one or more different types of minutiae within a prescribed area of each of said first and second fingerprint images, said first and second sets of data further comprising numbers of each of different types of minutiae lying within a constellation-type boundary defined by a plurality of minutiae of identical type and which encircle a core minutia, and said method further comprising:
  employing a scanning device to scan the fingerprint image and identify the plurality of minutiae in the fingerprint image;
  establishing the positions relative to one another of each of the minutiae of said plurality;
  providing a data store to store a set of data related to said relative positions of said minutiae;
  establishing the number of one or more types of minutiae of a first group of minutiae types present within said plurality;
  establishing the number of minutiae of one or more types of minutiae of a second group comprising other types of minutiae;
  storing in said data store data a set of data relating to the number of minutiae of one or more different types from the first group and from the second group; and then
  comparing said sets of data stored in said data store concerning the relative positions and numbers of different minutiae with data obtained in a similar manner from another fingerprint image thereby to establish whether two fingerprints are identical.

2. The method according to claim 1, further comprising:
establishing the numbers of each of one or more different types of minutiae within a prescribed distance from a core minutia.

3. A method of analysis and comparison of fingerprint images, said method comprising:
  receiving a first fingerprint image from a fingerprint imaging device;
  creating a first set of data from the first fingerprint image; and
  comparing said data with a second set of data obtained from a second fingerprint image to establish a correspondence of relative positions of minutiae of said first and second fingerprints, and comparing numbers of each of one or more different types of minutiae within a prescribed area of each of said first and second fingerprint images,
  said first and second sets of data further comprising numbers of each of different types of minutiae lying within a constellation-type boundary defined by a plurality of minutiae of identical type and which encircle a core minutia, and
  said method further comprising:
    employing a scanning device to identify within the first and second fingerprint images a plurality of minutiae of a first type;
    selecting one of said plurality of minutiae to be a core minutia, and surrounding said core minutia by an imaginary constellation loop comprising a plurality of other minutiae of the first type and a plurality of minutiae of other types;
    creating and storing a set of data which defines the positions relative to one another of at least each of said minutiae on the constellation loop and then counting the number of minutiae lying on and/or within the constellation loop and retaining in a data store said set of data and information related to the number of minutiae lying on and/or within the constellation loop; and
    comparing said set of data with a set of data obtained in a similar manner from another fingerprint image to establish whether two fingerprints are identical.

4. The method according to claim 3, further comprising:
establishing the numbers of each of one or more different types of minutiae within a prescribed distance from a core minutia.

* * * * *